May 20, 1969 J. H. RAIDL, JR., ET AL 3,445,032
SAFETY PRESSURE RELIEF DEVICE
Filed Nov. 21, 1966
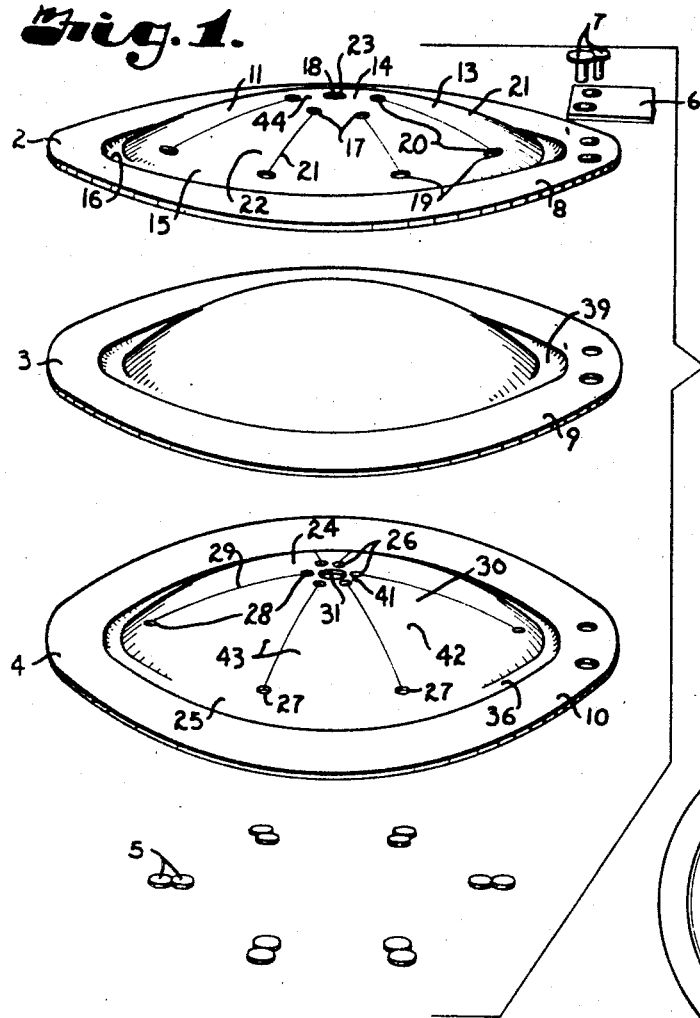
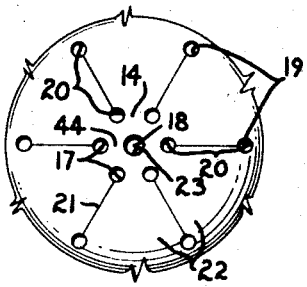
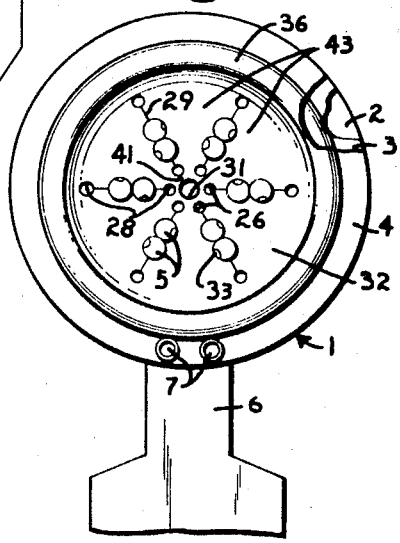
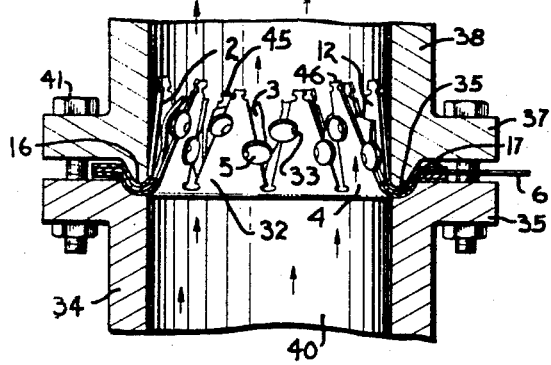
INVENTOR.
JOHN H. RAIDL, JR.,
ROBERT L. SOLTER, and
FRANKLIN A. HANSEN
Fishburn and Gold
ATTORNEYS

United States Patent Office 3,445,032
Patented May 20, 1969

3,445,032
SAFETY PRESSURE RELIEF DEVICE
John H. Raidl, Jr., Mission, Kans., and Robert L. Solter, Blue Springs, and Franklin A. Hansen, Raytown, Mo., assignors to Continental Disc Corporation, Kansas City, Mo., a corporation of Missouri
Filed Nov. 21, 1966, Ser. No. 595,949
Int. Cl. B65d 35/14, 35/24, 35/46
U.S. Cl. 220—89          9 Claims

ABSTRACT OF THE DISCLOSURE

This disclosure relates to pressure relief devices in the form of thin rupture members having dome-shaped bodies with weakened portions therethrough to control rupturing characteristics. The weakened portions include an inner circle of spaced apart apertures near the center of the dome, and an outer circle of more widely spaced apart apertures near the periphery of the dome. Selected apertures in the respective circles form radially aligned pairs of apertures which are joined by radially extending slits. A central aperture is located within the inner circle of apertures and the relationship between the central aperture and inner circle of apertures is such that the periphery of the central aperture is closer to each of the inner circle of apertures than any of the inner circle of apertures are to each other.

---

This invention may be applied to rupture members in the form of rupture discs and/or vacuum supports. The former are release devices which primarily determine the pressure at which relief is obtained within a pressure vessel. The latter constitute devices having the primary purpose of supporting a rupture disc and/or seal against reverse buckling or collapse in case a vacuum is formed within the pressure vessel. Although thin rupture members having strength weakening patterns are generally known, as presently formed they present several disadvantages. For example, they often include, or cause the formation of, loose parts which move downstream at high velocity upon the release of pressure. Such loose parts may constitute a serious danger to personnel and equipment and, further, may unknowingly become entrapped in valves or controls, interfering with the operation thereof. Known rupture discs also tend to be unpredictable as to actual rupturing pressure and present difficulties in combining accurate low rupturing pressures with small diameters. With respect to vacuum supports, disadvantages in addition to the release of loose parts often include undue complexity, interference with proper operation of the rupture disc, extreme thickness of material, making it difficult to produce a seal therewith, and a tendency to excessively block the relief passageway after opening.

The principal objects of the present invention are: to provide safety pressure devices having an improved weakening pattern applicable to either a rupture disc or a vacuum support; to provide such a pattern which produces high predictability and accuracy in bursting pressures; to provide such pressure relief structure which does not produce free fragments upon rupturing; to provide a vacuum support configuration which permits the support to open symmetrically for producing a proper flow passageway and without interfering with the proper operation of the associated rupture disc; to provide such a relief device which may be designed for accurate low bursting pressures in relatively small sizes; and to provide such a relatively simple, thin rupture member configuration which permits high versatility in design variations to produce a wide range of accurate rupturing pressures.

Other objects and advantages of this invention will become apparent from the following description taken in connection with the accompanying drawings wherein are set forth by way of illustration and example certain embodiments of this invention.

FIG. 1 is an exploded perspective view showing the various parts of a safety pressure relief device assembly including a rupture disc and a vacuum support respectively embodying this invention.

FIG. 2 is a fragmentary plan view on a reduced scale, particularly showing the weakening pattern of the rupture disc body.

FIG. 3 is a bottom plan view of the assembly on the scale of FIG. 2, particularly showing the vacuum support underside.

FIG. 4 is a vertical cross-sectional view through a relief duct, showing the assembly mounted therein and in ruptured condition, permitting the upward flow of fluid therepast.

Referring to the drawings in more detail:

The reference numeral 1 generally indicates a safety pressure relief device assembly embodying this invention. The assembly 1 includes a rupture disc 2, seal 3, vacuum support 4, vacuum support guide buttons 5, identifying tags 6, and rivets 7. The disc 2, seal 3 and vacuum support 4 are all of bulged configuration and nest into each other, being maintained in assembled relationship with the tag 6 by the rivets 7 extending through suitable openings in radial rims 8, 9 and 10 respectively thereof.

Referring to the disc 2, an upwardly dome-shaped body 11 presents a concave undersurface 12 and a convex upper surface 13, a central portion 14, and a peripheral portion 15. An annular reversed curve sealing flange 16 is integral between the body 11 and rim 8 and surrounds the peripheral portion 15. The body 11 has a first circle of holes or apertures 17 extending through the central portion 14 and located in symmetrically circumferentially spaced apart relationship around the center 18 of the disc 2. The body 11 has a second circle of holes or apertures 19 extending through the peripheral portion 15 and respectively radially aligned with the first apertures 17 forming radial aperture sets or pairs 20 therewith. The second apertures 19 are also located in symmetrically circumferentially spaced apart relationship about the center 18. A plurality of radially extending continuous breaks or slits 21 extend through the body 11 and respectively extend between and communicate at opposite ends with the respective aperture pairs 20, forming a plurality of body leaves 22 therebetween. A central aperture 23 extends through the center 18 of the central portion 14. The aperture 23 is of a size with respect to the size and location of the first apertures 17 whereby the periphery of the aperture 23 is closer to the periphery of each of the first apertures 17 than the peripheries of any of the apertures 17 are to each other.

The seal 3 is a very thin member adapted to fit upwardly within the disc 2, but rupture at a pressure significantly below the pressure required to rupture the disc 2. The seal 3 functions to prevent fluid from leaking through the apertures and slits in the disc 2 in either direction and transmit pressure evenly to the disc 2. The seal 3 may also serve to isolate the disc 2 from corrosive fluids.

The vacuum support 4 is similar in structure to the rupture disc 2; however, with variations enabling it to function as a support. The vacuum support 4 has central and peripheral portions 24 and 25 corresponding to the portions 14 and 15 on the disc 2, and first and second circles of apertures 26 and 27 corresponding to the apertures 17 and 19 on the disc. 2. Respective apertures 26 and 27 are radially aligned into pairs 28 and joined by radial breaks or slits 29. The material forming the support 4 is generally somewhat thicker than the disc 2 so as to better provide support against downward collapse of the dome under pressure exerted on the convex 30 thereof. The central aperture of the support 31 has the periphery thereof closer to the first apertures 26 than the apertures 26 are to each other, and further, the distance between the central aperture 31 and apertures 26 is substantially less than the distance from the disc central aperture 23 to the disc first apertures 17. The guide buttons 5 are secured, in this example, in adjacent radial pairs to the underside or concave surface 32 of the vacuum support 4 by means of spot welds 33. The guide buttons 5 are preferably of relatively rigid material in comparable thickness to the thickness of the vacuum support and overlap the respective slits 29 between the first apertures 26 and second apertures 27. Spot welds 33 retain the guide buttons 5 on the concave surface 32. The welds 33 are circumferentially staggered whereby the inner button of each pair is secured only to the material on one side of a slit 29, and the outer button of the pair is secured to the material on the opposite side of the slit 29.

The assembled device 1 is shown mounted on a pipe or tubular member 34, which serves as the relieving duct or outlet for a pressure vessel (not shown) to be protected. The tubular member 34 has a flange 35 extending radially therefrom and having an annular concave seat adapted to receive the sealing flange 36 of the vacuum support 4. A hold-down or flange 37 forms part of an exhaust passageway member 38, and is shaped to engage the sealing flange 16 of the disc 2 for urging same against the flange 39 of the seal 9, which, in turn, engages the inside of the vacuum support flange 36, producing a complete seal across the tubular member 34, blocking the relief passageway 40. The desired hold-down pressure is maintained between the tubular member 34 and passageway member 38 by means of suitable bolts 41.

As noted above, in both the disc 2 and vacuum support 4, the first or inner ring of apertures are closer to the periphery or wall of the central aperture than they are to each other, even though the absolute distances involved may be different, as may be seen by a comparison of FIGS. 2 and 3. Referring particularly to FIG. 3, the first circle of apertures 26 are quite close to the wall of the central aperture 31, leaving narrow, solid portions 41 therebetween as the highest stressed material on the vacuum support body 42 and the only material within the outer apertures 27 and between the leaves 43 resisting radial tearing. Further, the narrow, solid portions 41 provide supporting structure maintaining the leaves 43 in proper alignment with each other, whereby they abut along the slits 29 to resist buckling and collapse of the vacuum support when pressure is applied on the convex surface 30 thereof. In this regard, the buttons 5 also function to maintain the proper alignment between the edges of the leaves 43 to prevent overlapping of the leaf edges, which would considerably weaken the ability of the body 42 to support a positive differential pressure applied on the convex surface 30. With respect to the disc 2, the described relationship between the first circle of apertures 17 and the central aperture 23 presents narrow, solid body portions 44 which provide the highest stressed material resisting leaf opening. The portions 44 also comprise the only material within the outer apertures 19 and between the leaves 22 resisting radial tearing.

In operation, the assembly 1 normally completely seals the relief passageway 40 from the exhaust passageway member 38. When, however, the pressure in the relief passageway 40 reaches the design rupture pressure of the assembly 1, as determined primarily by the rupture resistance of the disc 2, the vacuum support 4, seal 3 and disc 2 open, providing free communication between the relief passageway 40 and the exhaust passageway member 38 for relieving pressure in the protected vessel (not shown). Upon rupture of the assembly 1, the disc and vacuum support bodies are torn radially respectively across areas of highest stress, that is, the bodies' solid portions 44 and 41, whereupon the respective leaves bend upwardly and outwardly, being hinged between the outer apertures 19 and 27. Because the portions 41 contain little material, the vacuum support by itself presents insufficient resistance against rupturing under normal pressures applied to the concave surface 32. The tearing of the portions 41, however, is normally prevented by the resistance offered by the disc 2 restraining the seal 3 which is maintained in contact with the vacuum support upper or convex surface 30. The seal 3, although weak in either direction, is normally prevented from either rupturing or buckling by the vacuum support 4 and the disc 2 against respective lower and upper surfaces thereof. The support 4 exhibits sufficient strength to prevent the assembly from caving in if a vacuum forms in the passageway 40 with atmospheric pressure maintained above the disc 2. The buttons 5, in addition to maintaining the leaves 43 properly abutting for strength against collapse, provide restraint adjacent the slits whereby the leaves all tend to move upwardly and outwardly together away from the center. This provides the most desirable configuration for noninterference with the opening of the seal and disc and produces a relatively unobstructed fluid passageway.

Because radial tears are formed in the disc 2 and vacuum support 4 upon rupture of the device 1, each of the opening leaves carries a small portion 45 or 46 of the periphery of the respective central apertures 23 and 31. Thus, no free fragments are created which would otherwise be directed downstream through the exhaust passageway member 38 at high velocity. The above-described weakening configuration on the respective rupture members 2 and 4 also allows for convenient wide variation in design rupture pressures, and allows the production of rupture members of low, accurate bursting pressures in relatively small diameters. These advantages are obtained because the designer not only may vary the thickness of the material used in forming the rupture member bodies, but also has the options of moving the first circle of apertures toward and away from the center of the rupture member and varying the diameter of the central aperture.

It is to be understood that although certain forms of this invention have been illustrated and described, it is not to be limited thereto except insofar as such limitations are included in the following claims.

What we claim and desire to secure by Letters Patent is:
1. A safety pressure relief device comprising:
 (a) a thin rupture member having a body with a central portion and a peripheral portion,
 (b) said rupture member body having a first group of apertures through said central portion and located in spaced apart relationship around the center of said central portion,
 (c) a plurality of outwardly extending continuous breaks through said body, said breaks respectively communicating into said respective first apertures and extending outwardly therefrom, forming a plurality of leaves, and
 (d) a central aperture through said central portion, said central aperture having the periphery thereof closer to the periphery of each of said first apertures than the periphery of any of said first apertures are to each other,
 (e) whereby uninterrupted body portions between said central aperture and said respective first apertures provide the only material between said leaves resisting radial tearing and the highest stressed material on said body when pressure is applied to said member and rupture is accompanied by radial tearing and no parts are freed from said member for movement downstream.
2. The device as set forth in claim 1 wherein:
 (a) said body is dome-shaped.

3. The device as set forth in claim 1 wherein:
(a) said first apertures are located in a circle and symmetrically circumferentially spaced apart around the center of said central portion.
4. The device as set forth in claim 1 wherein:
(a) said brakes are slits.
5. The device as set forth in claim 1 wherein:
(a) said rupture member body has a second group of apertures through said peripheral portion and said breaks extend between and communicate with respective pairs of apertures selected respectively from said first and second group.
6. The device as set forth in claim 5 wherein:
(a) said second apertures are respectively radially spaced from said first apertures and said breaks extend radially therebetween.
7. A safety pressure relief device comprising:
(a) a thin rupture member having a dome-shaped body with a concave surface and a convex surface, said body having a central portion and a peripheral portion, an annular sealing flange integral with and surrounding said body peripheral portion,
(b) said rupture member body having a first circle of apertures through said central portion and located in symmetrically circumferentially spaced apart relationship around the center of said central portion.
(c) said rupture member body having a second circle of apertures through said peripheral portion and respectively radially aligned with said first apertures forming radial aperture pairs therewith, said second apertures being located in symmetrically circumferentially spaced apart relationship about the center of said body central portion,
(d) a plurality of radially extending breaks through said body, said breaks respectively extending between said communicating at opposite ends into said aperture pairs forming a plurality of leaves therebetween, and
(e) a central aperture through the center of said central portion, said central aperture being closer to each of said first apertures than any of said first apertures are to each other, rupture being accompanied by radial tearing with no parts being freed from said member for movement downstream.
8. The device as set forth in claim 7 wherein:
(a) said breaks are slits.
9. The device as set forth in claim 8 including:
(a) a plurality of buttons secured to said concave surface and overlapping said slits,
(b) said buttons being respectively secured to said concave surface on only one side of the respective slit overlapped thereby.

References Cited

UNITED STATES PATENTS

| | | |
|---|---|---|
| 2,980,286 | 4/1961 | Coffman. |
| 3,072,288 | 1/1963 | Lemmer. |
| 3,091,359 | 5/1963 | Wood. |
| 3,121,509 | 2/1964 | Porter. |

WILLIAM F. O'DEA, *Primary Examiner.*

U.S. Cl. X.R.

137—68